US 8,423,072 B2

(12) United States Patent
Whinnett (10) Patent No.: US 8,423,072 B2
(45) Date of Patent: Apr. 16, 2013

(54) METHODS AND DEVICES FOR REDUCING INTERFERENCE IN AN UPLINK (75) Inventor: Nick Whinnett, Wiltshire (GB)

(73) Assignee: Mindspeed Technologies U.K., Limited, Bath (GB)

(*) Notice: Subject to any disclaimer, the term of this patent is extended or adjusted under 35 U.S.C. 154(b) by 0 days.

(21) Appl. No.: 12/773,970

(22) Filed: May 5, 2010

(65) Prior Publication Data
US 2010/0285795 A1 Nov. 11, 2010

(30) Foreign Application Priority Data
May 7, 2009 (GB) .................................. 0907787.6

(51) Int. Cl.
*H04B 7/00* (2006.01)

(52) U.S. Cl.
USPC ........ 455/522; 455/501; 455/67.13; 455/63.1; 455/444

(58) Field of Classification Search ................... 455/522, 455/63.1, 67.13, 501, 444
See application file for complete search history.

(56) References Cited

U.S. PATENT DOCUMENTS

| 2008/0146154 | A1 | 6/2008 | Claussen et al. | |
| 2008/0151832 | A1 | 6/2008 | Iwasaki | |
| 2009/0111503 | A1* | 4/2009 | Pedersen et al. | 455/522 |
| 2009/0264077 | A1* | 10/2009 | Damnjanovic | 455/63.1 |
| 2010/0234061 | A1* | 9/2010 | Khandekar et al. | 455/522 |
| 2010/0273481 | A1* | 10/2010 | Meshkati et al. | 455/435.1 |
| 2010/0329132 | A1* | 12/2010 | Raghothaman et al. | 370/252 |
| 2012/0258746 | A1* | 10/2012 | Tokgoz et al. | 455/501 |

FOREIGN PATENT DOCUMENTS

| EP | 1876854 A1 | 9/2008 |
| GB | 2 304 495 | 3/1997 |
| WO | 2008/030934 | 3/2008 |
| WO | 2008/090154 | 7/2008 |
| WO | 2008/155732 | 12/2008 |
| WO | 2009/054205 | 4/2009 |

OTHER PUBLICATIONS

3GPP TS 36.331 v9.2.0. 3rd Generation Partnership Project: Technical Specification Group Radio Access Network; Evolved Universal Terrestrial Radio Access (E-UTRA); Radio Resource Control (RRC); Protocol specification (Release 9) Mar. 2010, pp. 1-248.
3GPP TS 36.214 v9.1.0. 3rd Generation Partnership Project: Technical Specification Group Radio Access Network; Evolved Universal Terrestrial Radio Access (E-UTRA); Physical layer; Measurements (Release 9) Mar. 2010, pp. 1-14.
Search Report Issued on Jun. 4, 2009 by in Corresponding British Application No. GB0907787.6.
"Details on specification aspects for UL ICIC", Qualcomm Europe, May 5-May 9, 2008, 2 pages.

* cited by examiner

*Primary Examiner* — Barry Taylor
(74) *Attorney, Agent, or Firm* — Weide & Miller, Ltd.

(57) ABSTRACT

There is provided a method of operating a communication system, the communication system comprising at least a macrocell base station and a femtocell base station that is within the coverage area of the macrocell base station, the method comprising providing an indication of the noise rise or interference at the macrocell base station to the femtocell base station; and the femtocell base station adjusting a maximum permitted transmission power based on the indication.

19 Claims, 5 Drawing Sheets

METHODS AND DEVICES FOR REDUCING INTERFERENCE IN AN UPLINK

This application claims the benefit of priority application 0907787.6 filed in the United Kingdom on May 7, 2009. The subject matter of this application is incorporated herein by reference.

TECHNICAL FIELD OF THE INVENTION

The invention relates to communication networks that include femtocell base stations, and in particular to methods and devices for reducing a noise rise or interference caused by transmissions from mobile devices to a femtocell base station.

BACKGROUND TO THE INVENTION

Femtocell base stations in a Long Term Evolution (LTE) communication network (otherwise known as Home evolved Node Bs—HeNBs—or Enterprise evolved Node Bs—EeNBs) are small, low-power, indoor cellular base stations for residential or business use. They provide better network coverage and capacity than that available in such environments from the overlying macrocellular LTE network. In addition, femtocell base stations use a broadband connection to receive data from and send data back to the operator's network (known as "backhaul").

As femtocell base stations make use of the same air interface as macrocell base stations in the macrocellular network, and as they are located within the coverage area of one or more macrocell base stations in the macrocellular network, it is necessary to ensure that uplink transmissions from mobile devices (otherwise known as User Equipments—UEs) to the femtocell base station do not interfere substantially with uplink transmissions from other mobile devices to the macrocell base stations.

It has been suggested that this interference can be mitigated by placing a cap on the power that a mobile device can use to transmit to the femtocell base station. This cap is determined from an estimated path loss to the neighbouring macrocell base station with the strongest signal, such that, when the mobile device is transmitting to the femtocell base station at the capped power level, the increase in noise experienced at the macrocell base station is limited to a specified amount (measured in decibels, dB).

There is a problem with this approach in that the maximum permitted transmission power level only considers the noise increase caused by an individual mobile device. In order to maintain the noise rise at the macrocell base station to the specified fixed amount, the cap needs to be a function of the number of mobile devices that are transmitting to femtocell base stations (i.e. an increasing number of mobile devices transmitting to femtocell base stations should lead to a lower maximum permitted transmission power).

Hence, there is a need for an alternative approach to reducing the interference caused by mobile devices transmitting to femtocell base stations.

SUMMARY OF THE INVENTION

Therefore, according to a first aspect of the invention, there is provided a method of operating a communication system, the communication system comprising at least a macrocell base station and a femtocell base station that is within the coverage area of the macrocell base station, the method comprising providing an indication of the noise rise or interference at the macrocell base station to the femtocell base station; and the femtocell base station adjusting a maximum permitted transmission power for mobile devices transmitting to the femtocell base station based on the indication.

In some embodiments, the femtocell base station determines a target noise rise or interference level at the macrocell base station from the indication of the noise rise or interference.

In some embodiments, the step of adjusting can comprise adapting the maximum permitted transmission power based on the target noise rise or interference level.

In some embodiments, the step of adjusting can comprise reducing the maximum permitted transmission power in the event that the received notification indicates that the noise rise or interference at the macrocell base station is relatively high, or increasing the maximum permitted transmission power in the event that the received notification indicates that the noise rise or interference at the macrocell base station is relatively low.

In the above embodiment, reducing or increasing the maximum permitted transmission power can comprise reducing or increasing the maximum permitted transmission power to a respective predetermined value. Alternatively, reducing or increasing the maximum permitted transmission power can comprise reducing or increasing the maximum permitted transmission power by a predetermined amount.

In preferred embodiments, the step of providing comprises providing the indication of the noise rise or interference using signalling on an X2 interface.

Preferably, the indication of the noise rise or interference comprises an "UL Interference Overload" indicator.

In some embodiments, the step of providing comprises providing the indication of the noise rise or interference from the macrocell base station.

In other embodiments, the step of providing comprises providing the indication of the noise rise or interference from an X2 proxy or femto gateway having a communication interface with the femtocell base station and the macrocell base station.

Preferably, the method further comprises, after providing an indication that the noise rise or interference at the macrocell base station is relatively high, the steps of determining whether the noise rise or interference at the macrocell base station has improved; in the event that the noise rise or interference at the macrocell base station has not improved, providing a second indication to the femtocell base station; and the femtocell base station increasing the maximum permitted transmission power for mobile devices transmitting thereto based on the second indication.

In further embodiments, the communication system further comprises at least one other macrocell base station neighbouring the macrocell base station, the method further comprising, after providing an indication that the noise rise or interference at the macrocell base station is relatively high, the steps of determining whether the noise rise or interference at the macrocell base station has improved; in the event that the noise rise or interference at the macrocell base station has not improved, providing an indication of the noise rise or interference at the macrocell base station to said at least one other macrocell base station; and said at least one other macrocell base station adjusting a maximum permitted transmission power for mobile devices transmitting thereto based on the indication.

According to a second aspect of the invention, there is provided a method of operating a femtocell base station that is within the coverage area of a macrocell base station, the method comprising receiving an indication of the noise rise or interference at the macrocell base station; and adjusting a maximum permitted transmission power that is used by mobile devices transmitting to the femtocell base station based on the received indication.

In some embodiments, the femtocell base station determines a target noise rise or interference level at the macrocell base station from the indication of the noise rise or interference.

In some embodiments, the step of adapting comprises adapting the maximum permitted transmission power based on the target noise rise or interference level.

In some embodiments, the step of adapting can comprise reducing the maximum permitted transmission power in the event that the received notification indicates that the noise rise or interference at the macrocell base station is relatively high, or increasing the maximum permitted transmission power in the event that the received notification indicates that the noise rise or interference at the macrocell base station is relatively low.

In the above embodiment, reducing or increasing the maximum permitted transmission power comprises reducing or increasing the maximum permitted transmission power to a respective predetermined value. Alternatively, reducing or increasing the maximum permitted transmission power can comprise reducing or increasing the maximum permitted transmission power by a predetermined amount.

In preferred embodiments, the step of receiving comprises receiving the indication of the noise rise or interference using signalling on an X2 interface.

Preferably, the indication of the noise rise or interference comprises an "UL Interference Overload" indicator.

In some embodiments, the step of receiving comprises receiving the indication of the noise rise or interference from the macrocell base station.

In other embodiments, the step of receiving comprises receiving the indication of the noise rise or interference from an X2 proxy or femto gateway having a communication interface with the femtocell base station and the macrocell base station.

According to a third aspect of the invention, there is provided a femtocell base station configured to perform the method described above.

According to a fourth aspect of the invention, there is provided a method of operating a network node, the network node having a communication interface with a femtocell base station, the femtocell base station being located in the coverage area of a macrocell base station, the method comprising providing an indication of the noise rise or interference at a macrocell base station to the femtocell base station, such that the femtocell base station sets a maximum permitted transmission power for mobile devices transmitting to the femtocell base station based on the received indication.

In preferred embodiments, the step of providing comprises providing the indication of the noise rise or interference using signalling on an X2 interface.

Preferably, the indication of the noise rise or interference comprises an "UL Interference Overload" indicator.

Preferably, the method further comprises, after providing an indication that the noise rise or interference at the macrocell base station is relatively high, the steps of determining whether the noise rise or interference at the macrocell base station has improved; and in the event that the noise rise or interference at the macrocell base station has not improved, providing a second indication to the femtocell base station, such that the femtocell base station increases the maximum permitted transmission power for mobile devices transmitting thereto based on the second indication.

In further embodiments, after providing an indication that the noise or interference at the macrocell base station is relatively high, the method further comprises the steps of determining whether the interference at the macrocell base station has improved; and in the event that the noise rise or interference at the macrocell base station has not improved, providing an indication of the interference at the macrocell base station to at least one other macrocell base station neighbouring the macrocell base station, such that the at least one other macrocell base station sets a maximum permitted transmission power for mobile devices transmitting thereto based on the indication.

In a preferred embodiment, the network node is the macrocell base station.

In an alternative embodiment, the network node has a communications interface with the macrocell base station and the femtocell base station.

In these embodiments, the network node is an X2 proxy or a femto gateway.

According to a fifth aspect of the invention, there is provided a network node configured to perform the method described above.

BRIEF DESCRIPTION OF THE DRAWINGS

The invention will now be described in detail, by way of example only, with reference to the following drawings, in which.

DETAILED DESCRIPTION OF THE PREFERRED EMBODIMENTS

Although the invention will be described below with reference to an LTE communication network and femtocell base stations or HeNBs, it will be appreciated that the invention is applicable to other types of third or subsequent generation network in which femtocell base stations (whether for home or business use), or their equivalents in those networks, can be deployed. Moreover, although in the embodiments below the femtocell base stations and macrocell base stations use the same air interface (LTE), it will be appreciated that the invention can be used in a situation in which the macrocell and femtocell base stations use different air interfaces (for example the macrocell base stations could use WCDMA while the femtocell base stations use LTE).

Figure 1:
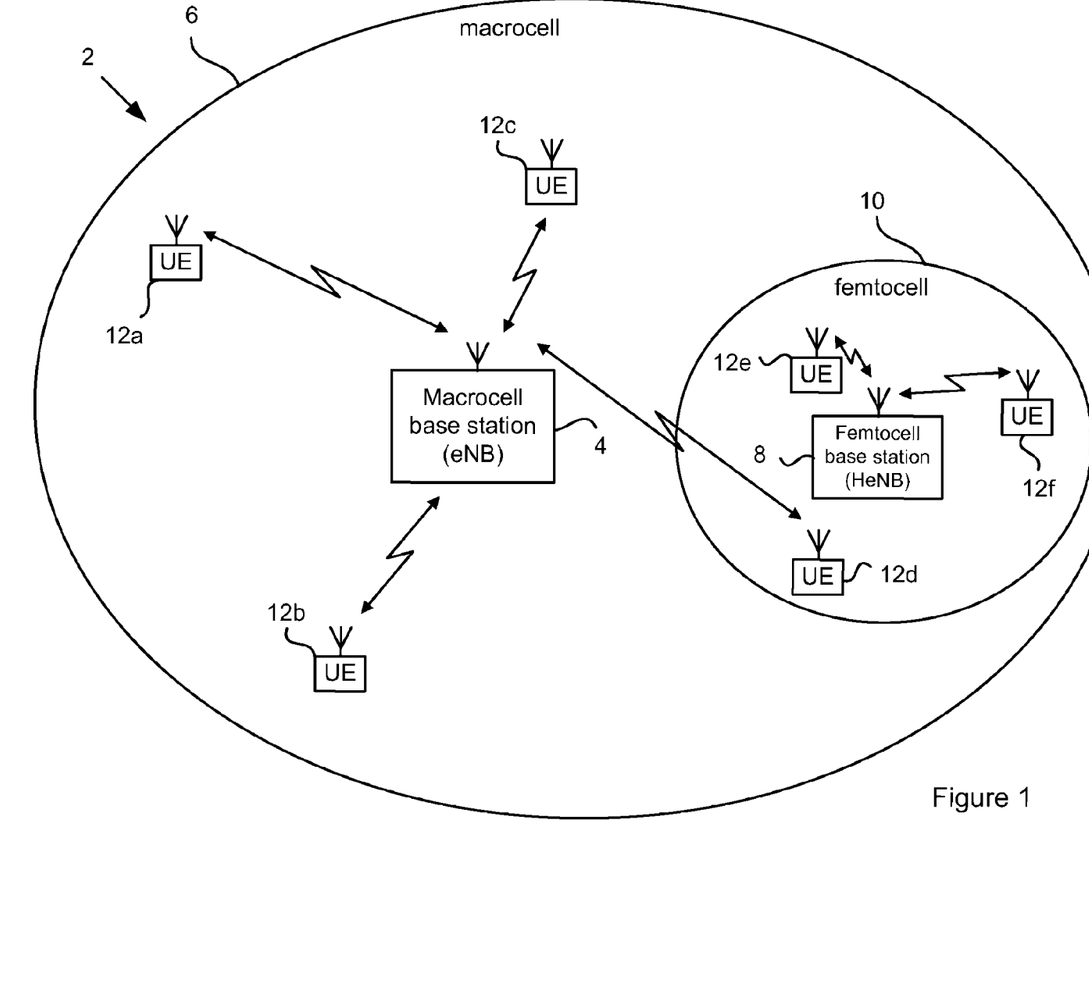
FIG. 1 shows an exemplary communication network.

FIG. 1 shows part of an exemplary communication network 2 in which the invention can be implemented. The communication network 2 includes a plurality of macrocell base stations 4 (only one of which is shown in FIG. 1) that each define a respective coverage area—indicated by macrocell 6. In an LTE communication network, the macrocell base stations 4 are referred to as evolved Node Bs (eNBs).

One or more femtocell base stations 8 (Home eNBs-HeNBs) can be located within the coverage area 6 of the macrocell base station 4 (although only one femtocell base station 8 is shown in FIG. 1), with each femtocell base station 8 defining a respective coverage area—indicated by femtocell 10).

It will be appreciated that FIG. 1 has not been drawn to scale, and that, in most real-world implementations, the coverage area 10 of the femtocell base station 8 will be significantly smaller than the coverage area 6 of the macrocell base station 4.

A number of mobile devices (UEs) 12 are also located in the communication network 2 within the coverage area 6 of the macrocell base station 4.

Four mobile devices 12a, 12b, 12c and 12d are each associated with the macrocell base station 4, meaning that they transmit and/or receive control signalling and/or data using the macrocell base station 4. It will be noted that although the mobile device 12d is also within the coverage area 10 of the femtocell base station 8, it is associated with the macrocell base station 4 (this could be due to the signal strength of the macrocell base station 4 being significantly better for mobile device 12d than the signal strength of the femtocell base station 8 or the femtocell base station 8 could be restricted to specific subscribers that don't include mobile device 12d, etc.). Mobile devices 12a, 12b, 12c and 12d are referred to collectively herein as "macro-UEs", as they are the mobile devices/user equipments (UEs) associated with the macrocell base station 4.

Two further mobile devices, 12e and 12f, are located within the coverage area 10 of the femtocell base station 8 and are associated with the femtocell base station 8, meaning that they transmit and/or receive control signalling and/or data using the femtocell base station 8. Mobile devices 12e and 12f are referred to collectively herein as "femto-UEs", as they are the mobile devices/user equipments (UEs) associated with the femtocell base station 8.

As described above, unless properly controlled, the uplink transmissions from the femto-UEs (i.e. the transmissions from mobile devices 12e and 12f to the femtocell base station 8) cause undesirable levels of interference at the macrocell base station 4, which will impair the quality of the uplink transmissions from the macro-UEs (i.e. the transmissions from mobile devices 12a, 12b, 12c and 12d to the macrocell base station 4).

Figure 2:
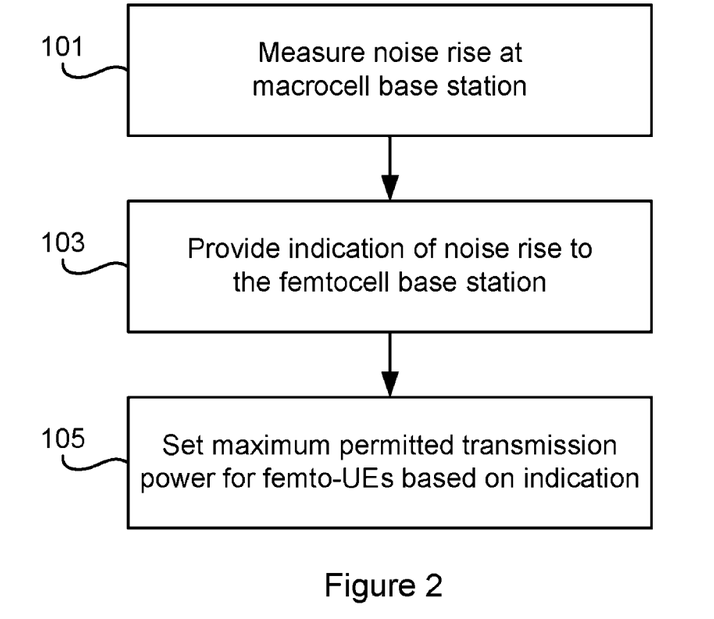
FIG. 2 is a flow chart illustrating a method in accordance with the invention.

In accordance with the invention, the femtocell base station 8 sets the maximum permitted transmission power for the femto-UEs based on a measurement of the noise or interference at the macrocell base station 4. This method is illustrated in FIG. 2.

It will be appreciated that instead of measuring a noise rise, it is possible to measure an interference level, or a noise and interference level, or any other similar parameter.

In particular, in step 101, a noise rise is measured at the macrocell base station 4. In one embodiment, the thermal noise level can be measured according to the "Thermal noise power" measurement defined in 3GPP TS 36.214 and the interference plus noise power level can be measured according to the "Received Interference Power" measurement defined in 3GPP TS 36.214. The noise rise can then be determined as the ratio of these two measurements.

In step 103, an indication of the measured noise rise or a permissible noise rise at the macrocell base station 4 is provided to the femtocell base station 8.

In step 105, the femtocell base station 8 sets the maximum permitted transmission power for all of the femto-UEs associated therewith based on the indication of the measured noise rise or permissible noise rise.

In a particular embodiment, the femtocell base station 8 can reduce the maximum permitted transmission power if the received notification indicates that the noise rise or interference at the macrocell base station 4 is above a first threshold value, and increase the maximum permitted transmission power if the received notification indicates that the noise rise or interference at the macrocell base station 8 is below a second threshold value. The second threshold value can be equal to the first threshold value. However, the second threshold value can be less than the first threshold value, which means that the femtocell base station 8 can maintain the maximum permitted transmission power at its current value when the received notification indicates that the noise rise or interference at the macrocell base station 4 is between the first and second threshold values.

In particular embodiments, the femtocell base station 8 sets appropriate values within the P-Max, UplinkPowerControlCommon and/or UplinkPowerControlDedicated Information Elements (as defined in 3GPP TS 36.331).

Figure 3:
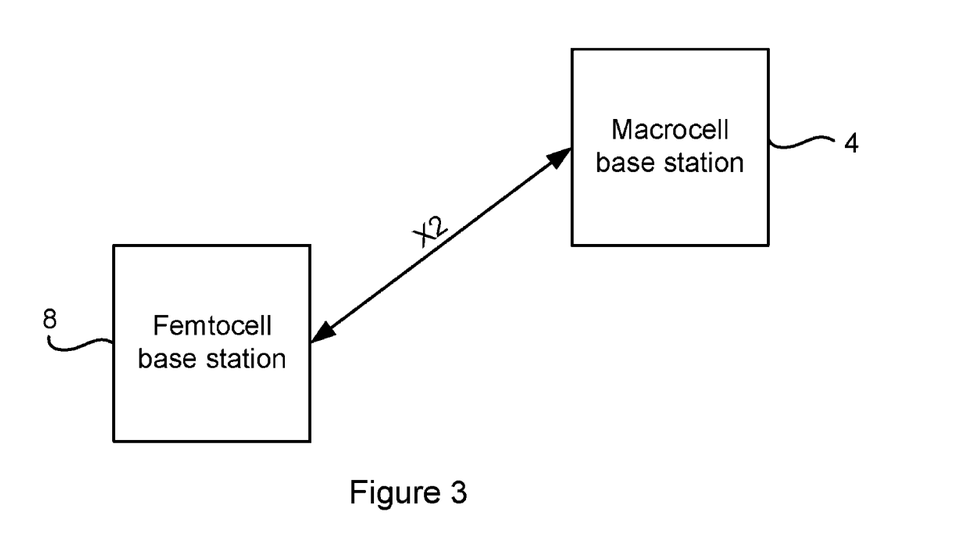
FIG. 3 is an illustration of an X2 interface between a macrocell base station and a femtocell base station.

In one embodiment, the indication can be provided to the femtocell base station 8 using an interface known as X2, which is an interface used to interconnect macrocell base stations, and potentially (in future releases of the LTE specifications) macrocell base stations and femtocell base stations. The X2 interface is illustrated in FIG. 3. The X2 interface allows macrocell base stations and femtocell base stations to initiate and complete actions, such as handovers, without having to use higher network authorities to co-ordinate the action.

In particular, the X2 interface can be used to provide a femtocell base station 8 with an indication of the loading and usage of the macrocell base station 4, which is not available by other means. It is this indication that can be used by the femtocell base station 8 to set the maximum permitted transmission power for the femto-UEs.

The indication can comprise the X2 "UL Interference Overload" indicator, which indicates the interference overload at the macrocell base station 4 in terms of a "high", "medium" or "low" value for each physical resource block (PRB).

The femtocell base station 8 can be configured to interpret a "high" value for the "UL Interference Overload" indicator to mean that the noise rise at the macrocell base station 4 caused by the femto-UEs should be lower than when the value of the indicator is "low". The femtocell base station 8 can adjust the maximum permitted transmission power for the femto-UEs accordingly. In particular, the femtocell base station 8 can set the maximum permitted transmission power to a lower value if the noise rise at the macrocell base station 4 should be a low value, and vice versa.

In one embodiment, the femtocell base station 8 can interpret the value of the "UL Interference Overload" indication in an absolute manner, for example by associating a specific value of the noise rise at the macrocell base station 4 with the different values of the indicator. The femtocell base station 8 can set the maximum permitted transmission power for the femto-UEs to meet the specified noise requirements.

An exemplary noise rise at the macrocell base station 4 when the "UL Interference Overload" indicator is "high" can be 0.1 dB, while an exemplary noise rise at the macrocell base station 4 when the indicator is "low" can be 1.0 dB. The noise rise when the indicator is "medium" can be an intermediate value, say, 0.5 dB.

Using the X2 interface in this way has the advantage that all femtocell base stations 8 within the coverage area of the macrocell base station 4 will be synchronized, in terms of the target noise rise at the macrocell base station 4. This is because there is an X2 interface between the macrocell base station 4 and each of the femtocell base stations 8 within its coverage area 6, and each femtocell base station 8 will receive the same "UL Interference Overload" indicator value.

In an alternative embodiment, the femtocell base station 8 can interpret the value of the "UL Interference Overload" indicator in a relative manner, for example by increasing, reducing or maintaining the level of noise rise caused by the femto-UEs at the macrocell base station 4 according to the value of the indicator. For example, if the "UL Interference Overload" indicator is "high", then it is assumed that the noise rise at the macrocell base station 4 caused by the femto-UEs should be reduced by, say, 0.1 dB. Similarly, if the "UL Interference Overload" indicator is "low", then it is assumed that the noise rise at the macrocell base station 4 caused by the femto-UEs can be increased by, say, 0.1 dB. The femtocell base station 8 can maintain the current noise rise at the macrocell base station 4 on receipt of a "medium" value of the indicator.

In this embodiment, however, it may be necessary to periodically synchronise the femtocell base stations 8 to make sure that they are all using the same value of the noise rise at the macrocell base station 4. This synchronization can be performed using signaling over the X2 interface.

In an alternative embodiment of the invention, instead of using the "UL Interference Overload" indicator in the X2 interface, the indication can be provided using a different message in the X2 interface that allows a more granular adjustment of the permitted noise rise at the macrocell base station 4 caused by the femto-UEs. For example, this message can be defined to be able to indicate a plurality of specific values for the permitted noise rise at the macrocell base station 4. Moreover, the value of this message could be set individually for each of the femtocell base stations 8 within the coverage area 6 of the macrocell base station 4, allowing even greater control over the noise rise at the macrocell base station 4 caused by different groups of femto-UEs.

Although the method described above can control noise rise at the macrocell base station 4 caused by femto-UEs, it may be that some or all of the noise rise at the macrocell base station 4 is actually being caused by transmissions from mobile devices that are associated with other neighbouring macrocell base stations (which are not shown in FIG. 1).

Therefore, it may be undesirable (and unnecessary) to restrict the maximum permitted transmission power of the femto-UEs if the noise rise is being caused by the macro-UEs associated with another macrocell base station, while at the same time it is undesirable to restrict the maximum permitted transmission power of those macro-UEs if the noise rise is being caused by the femto-UEs otherwise the coverage areas of those other macrocell base stations may be reduced.

Figure 4:
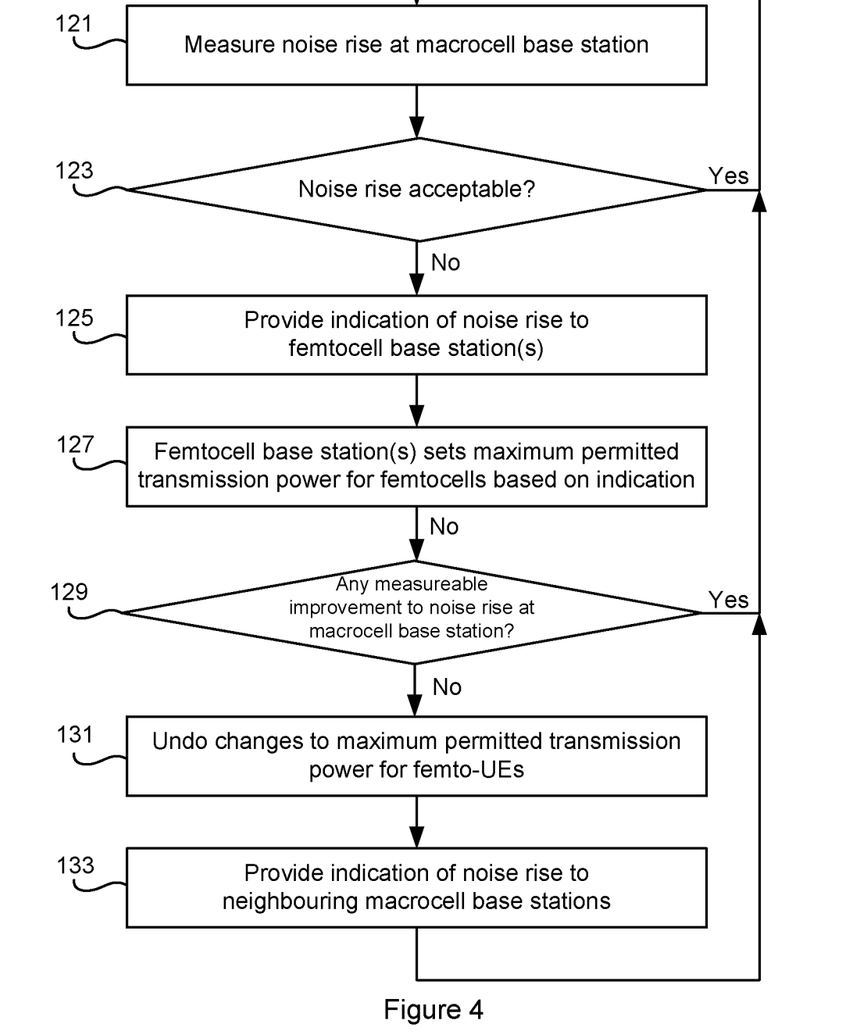
FIG. 4 is a flow chart illustrating an alternative method in accordance with the invention.

The flow chart in FIG. 4 illustrates a method of operating the communication system 2 to overcome this problem. In this method, the operation of the femto-UEs (in terms of their maximum permitted transmission power) is adapted independently of the operation of the macro-UEs (in terms of their maximum permitted transmission power).

In step 121, the noise rise at the macrocell base station 4 is measured. This step is performed in the same way as step 101 in FIG. 2 described above.

In step 123, it is determined whether the measured noise rise is acceptable. This can be determined by comparing the measured noise rise to a threshold noise value. If the noise rise is acceptable, the method returns to step 121.

If the noise rise is unacceptable, the method moves to step 125 in which an indication of the noise rise is provided to the femtocell base station(s) 8 within the coverage area 6 of the macrocell base station 4. This indication can be provided to the femtocell base station(s) 8 using any of the embodiments described above with reference to FIGS. 2 and 3.

At step 127, the femtocell base station(s) 8 adjust the maximum permitted transmission power for their associated femto-UEs based on the received indication. Again, this adjustment can be performed in accordance with any of the embodiments described above with reference to FIGS. 2 and 3.

At step 129, it is determined whether the adjustment to the maximum permitted transmission power for the femto-UEs has resulted in a measurable or significant improvement (i.e. a reduction) in the noise rise at the macrocell base station 4.

If this adjustment has resulted in a measurable improvement in the noise rise, the method returns to step 121 and repeats.

If this adjustment has not resulted in a measurable improvement to the noise rise, then it is likely that the noise rise at the macrocell base station 4 is not caused by the femto-UEs, so the method moves to step 131 in which the changes to the maximum permitted transmission power for the femto-UEs are undone or reversed. This reversal can be achieved by providing an appropriate indication to the femtocell base station(s) 8, which causes the femtocell base station(s) 8 to set the maximum permitted transmission power to the value in place before step 127 was carried out.

In the next step, step 133, an indication of the noise rise at the macrocell base station 4 is provided to other macrocell base stations neighbouring the macrocell base station 4. As with the embodiments of the invention described above, this indication can be provided to the other macrocell base stations using signalling on the X2 interface, and the macrocell base stations can be configured to use the indication to adjust a maximum permitted transmission power for the macro-UEs associated therewith.

Figure 5:
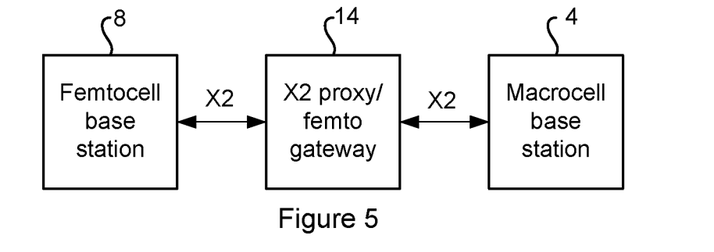
FIG. 5 is an illustration of an X2 proxy or femto gateway between a macrocell base station and a femtocell base station.
Figure 6:
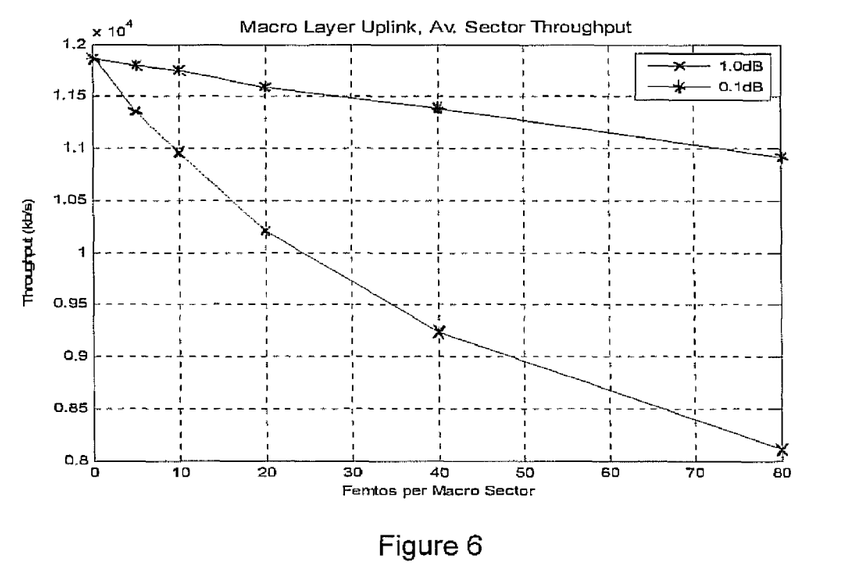
FIG. 6 is a graph illustrating the change in throughput against femtocell density in a macrocell sector.

In the above embodiments of the invention, signaling over the X2 interface between the femtocell base station 8 and macrocell base station 4 is used to provide the indication of the noise rise at the macrocell base station 4. However, in alternative embodiments of the invention, an X2 proxy or femtocell gateway could be provided between the femtocell base station 8 and the macrocell base station 4. This is illustrated in FIG. 5.

The X2 proxy or femto gateway 14 reduces the number of X2 interfaces the macrocell base station 4 needs to maintain with the femtocell base stations 8 within its coverage area 6. Instead of an X2 interface with each of the femtocell base stations 8, the macrocell base station 4 will have a single X2 interface with the X2 proxy/femto gateway 14 (as well as X2 interfaces with neighbouring macrocell base stations) and the X2 proxy/femto gateway will have respective X2 interfaces to each of the femtocell base stations 8. Alternatively, an interface other than X2 could be used as the interface between the X2 proxy/femto gateway and the femtocell base stations 8.

The X2 proxy or femto gateway 14 will receive the load information originating from the macrocell base station 4, adjust the indication (if necessary) and send an appropriate indication to the femtocell base stations 8. The X2 proxy or femto gateway 14 can receive the "UL Interference Overload" indicator from the macrocell base station 4 as described above and can provide the same or a different indicator to the femtocell base stations 8.

In a communication system that implements the method illustrated in FIG. 4, the X2 proxy or femto gateway 14 can avoid the need for the macrocell base station 4 to be modified in any way from conventional designs, since each of steps 121-125, 129 and 131 can be performed by the X2 proxy or femto gateway 14. In particular, the X2 proxy or femto gateway 14 can determine if the changes to the femto-UEs maximum permitted transmission power has any impact on the noise rise measured at the macrocell base station 4 and adjust the signalling to the femtocell base stations 8 accordingly.

The procedures described with reference to FIGS. 2 and 4 can be performed per physical resource block (PRB), as the current specifications for LTE (in particular 3GPP TS 36.214) indicate that interference measurements by a macrocell base station 4 and X2 signaling is performed per resource block. In this case, the maximum transmission power that a femto-UE is allowed to use is set as a function of the set of PRBs assigned to that femto-UE (noting that the femto-UE transmission power is constant across the PRBs assigned to it).

Furthermore, the macrocell base station 4 and femtocell base stations 8 may use non-identical but overlapping sets of PRBs. Therefore, when setting the maximum permitted transmission power for the femto-UEs, the femtocell base station 8 will consider indications received for those macrocell PRBs which overlap the set of PRBs used by the femtocell.

Furthermore, each procedure can be performed separately for each frequency carrier in use in the communication network 2.

Although each of the embodiments above has been described through the use of the X2 interface, it will be appreciated that it is possible to use signaling over alternative control interfaces (whether an X2 proxy or femto gateway is present in the communication system 2 or not).

For example, in an alternative embodiment, instead of using X2 interfaces, the maximum permitted transmission power for the femto UEs could be controlled on a slower basis via Operations and Maintenance (O&M) interfaces between the femtocell base stations 8 and an operations centre that is located in the core network (not shown in FIG. 1). The control can be provided by the operations centre on the basis of interference reports received from the macrocell base station 4 (which are sent to the operations centre via interfaces between the macrocell base station 4 and the operations centre). In this case, the geographic locations of femtocell base stations 8 and macrocell base stations 4 may be known and therefore the control at the operations centre could also set the maximum permitted transmission power for the femto-UEs as a function of the density of femtocell base stations 8 within the coverage area 6 of a macrocell base station 4.

FIGS. 6 to 9 illustrate the performance benefits of the invention described above.

Figure 7:
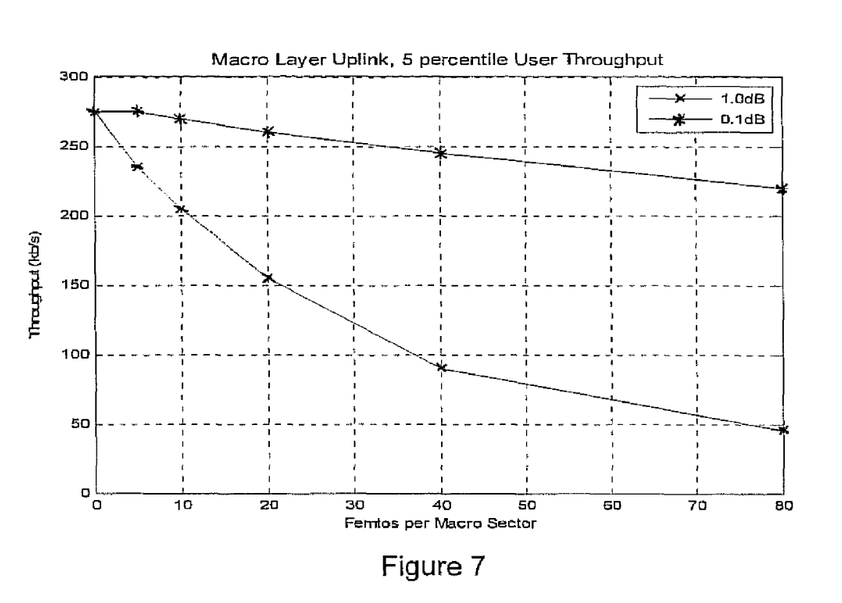
FIG. 7 is a graph illustrating the change in throughput against femtocell density for a user equipment at the edge of the macrocell.
Figure 8:
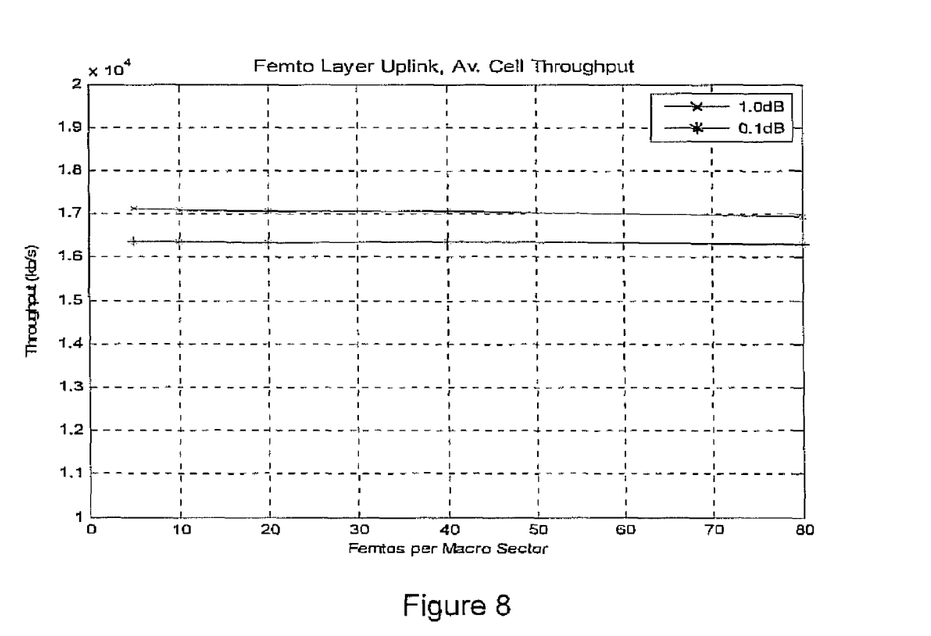
FIG. 8 is a graph illustrating the change in throughput against femtocell density in a femtocell sector.

It can be seen that for a fixed scheme, with the target noise rise at the macrocell base station set to 1 dB, there is a significant degradation in the performance of the macrocell as the density of active femtocell base stations per macrocell increases for both the average UE (FIG. 6) and UEs at the cell edge (FIG. 7). For example, for cell edge (5 percentile) UEs, the throughput is reduced from about 275 kb/s to 50 kb/s, as the number of femtocell base stations increase.

Figure 9:
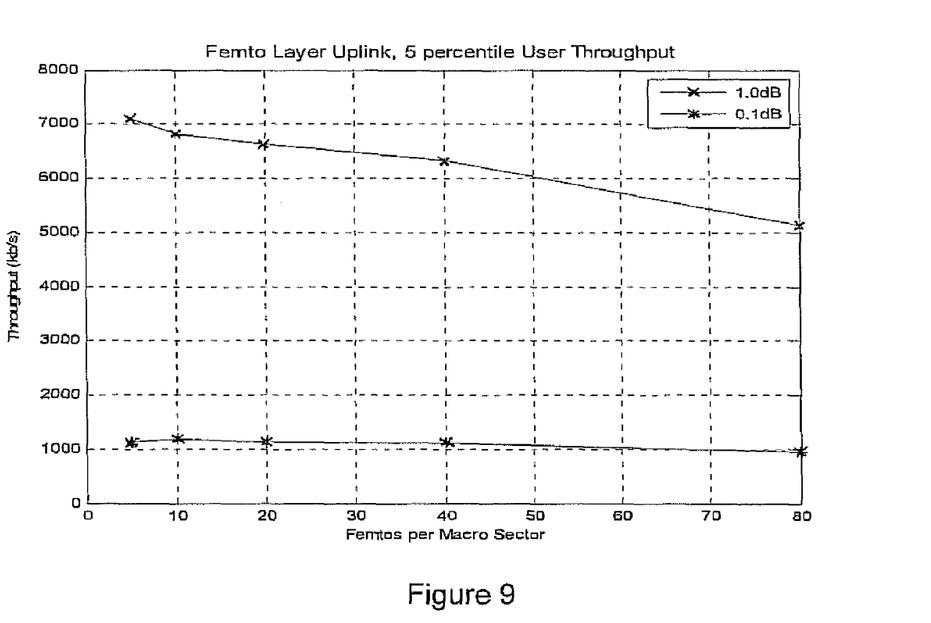
FIG. 9 is a graph illustrating the change in throughput against femtocell density for a user equipment at the edge of the femtocell.

However, with a noise rise set to 0.1 dB, the performance degradation is much less significant for the macrocell, but it does result in a restriction in throughput in the femtocells when the density of femtocells is low (FIG. 9 for example shows that the throughput for cell edge—5 percentile—UEs is reduced from 7 Mb/s to 1 Mb/s).

Therefore, these graphs indicate that the adaptation of the maximum permitted transmission power is desirable and will provide performance benefits over the conventional fixed maximum permitted transmission power scheme.

Furthermore, the graphs indicate that making the adaptation of the maximum permitted transmission power more granular (i.e. having more than two permissible noise rises of 0.1 dB and 1.0 dB) will also be advantageous. For example, a value of 0.5 dB for the noise rise for medium densities of femtocells should provide better performance for the femtocells than with a noise rise of 0.1 dB, while still providing adequate protection for macro-UEs.

While the invention has been illustrated and described in detail in the drawings and foregoing description, such illustration and description are to be considered illustrative or exemplary and not restrictive; the invention is not limited to the disclosed embodiments.

Variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of operating a communication system, the communication system comprising at least a macrocell base station and a femtocell base station that is within the coverage area of the macrocell base station, the method comprising:
   providing an indication of the noise rise or interference experienced at the macrocell base station to the femtocell base station; and
   adjusting, in the femtocell base station, a maximum permitted uplink transmission power for mobile devices transmitting in an uplink to the femtocell base station based on the indication;
   after a reduction, in the femtocell base station, in the maximum permitted uplink transmission power for mobile devices transmitting to the femtocell base station:
      determining whether the noise rise or interference at the macrocell base station has improved and in the event that the noise rise or interference at the macrocell base station has not improved, providing a second indication to the femtocell base station; and
      increasing, in the femtocell base station, the maximum permitted uplink transmission power for mobile devices transmitting in an uplink to the femtocell base station based on the second indication.

2. A method as claimed in claim 1, wherein the femtocell base station determines a target noise rise or interference level at the macrocell base station from the indication of the noise rise or interference.

3. A method as claimed in claim 2, wherein the step of adjusting comprises adapting the maximum permitted uplink transmission power based on the target noise rise or interference level.

4. A method as claimed in claim 1, wherein the step of adjusting comprises reducing the maximum permitted uplink transmission power in the event that the received notification indicates that the noise rise or interference at the macrocell base station is above a first threshold value, or increasing the maximum permitted uplink transmission power in the event that the received notification indicates that the noise rise or interference at the macrocell base station is below a second threshold value, the second threshold value being equal to or less than the first threshold value.

5. A method as claimed in claim 4, wherein reducing or increasing the maximum permitted uplink transmission power comprises reducing or increasing the maximum permitted uplink transmission power to a respective predetermined value.

6. A method as claimed in claim 4, wherein reducing or increasing the maximum permitted uplink transmission power comprises reducing or increasing the maximum permitted uplink transmission power by a predetermined amount.

7. A method as claimed in claim 1, wherein the step of providing comprises providing the indication of the noise rise or interference using signaling on an X2 interface.

8. A method as claimed in claim 7, wherein the indication of the noise rise or interference comprises an "UL Interference Overload" indicator.

9. A method as claimed in claim 1, wherein the step of providing comprises providing the indication of the noise rise or interference from the macrocell base station.

10. A method as claimed in claim 1, wherein the step of providing comprises providing the indication of the noise rise or interference from an X2 proxy or femto gateway having a communication interface with the femtocell base station and the macrocell base station.

11. A method as claimed in claim 1, the communication system further comprising at least one other macrocell base station neighboring the macrocell base station, the method further comprising, after providing the second indication to the femtocell base station, the steps of:
providing an indication of the noise rise or interference at the macrocell base station to said at least one other macrocell base station; and
said at least one other macrocell base station adjusting a maximum permitted uplink transmission power for mobile devices transmitting to the femtocell base station based on the indication.

12. A method of operating a network node, the network node having a communication interface with a femtocell base station, the femtocell base station being located in the coverage area of a macrocell base station, the method comprising:
providing, to the femtocell base station, an indication of the noise rise or interference at a macrocell base station, such that the femtocell base station sets a maximum permitted uplink transmission power for mobile devices transmitting in an uplink to the femtocell base station based on the received indication;
after a reduction, in the femtocell base station, in the maximum permitted uplink transmission power for mobile devices transmitting in an uplink to the femtocell base station:
determining whether the noise rise or interference at the macrocell base station has improved and in the event that the noise rise or interference at the macrocell base station has not improved, providing a second indication to the femtocell base station to cause the femtocell base station to increase; the maximum permitted uplink transmission power for mobile devices transmitting in an uplink to the femtocell base station based on the second indication.

13. A method as claimed in claim 12, wherein the step of providing comprises providing the indication of the noise rise or interference using signaling on an X2 interface.

14. A method as claimed in claim 13, wherein the indication of the noise rise or interference comprises an "UL Interference Overload" indicator.

15. A method as claimed in claim 12, further comprising after providing the second indication to the femtocell base station, the steps of:
providing an indication of the interference at the macrocell base station to at least one other macrocell base station neighboring the macrocell base station, such that the at least one other macrocell base station sets a maximum permitted uplink transmission power for mobile devices transmitting to the femtocell base station based on the indication.

16. A method as claimed in claim 12, wherein the network node is the macrocell base station.

17. A method as claimed in claim 12, wherein the network node has a communications interface with the macrocell base station and the femtocell base station.

18. A method as claimed in claim 17, wherein the network node is an X2 proxy or a femto gateway.

19. A network node configured to perform the steps as claimed in claim 12.

* * * * *